United States Patent
Lyons et al.

[11] Patent Number: 6,094,665
[45] Date of Patent: Jul. 25, 2000

[54] METHOD AND APPARATUS FOR CORRECTING A UNIFORM RESOURCE IDENTIFIER

[75] Inventors: Nicholas P. Lyons, Sunnyvale; Carl H. Staelin, Palo Alto, both of Calif.

[73] Assignee: Hewlett-Packard Company, Palo Alto, Calif.

[21] Appl. No.: 08/933,183

[22] Filed: Sep. 18, 1997

[51] Int. Cl.[7] .................................................. G06F 17/27
[52] U.S. Cl. ......................... 707/531; 707/530; 382/309; 382/310; 382/321
[58] Field of Search .................................... 707/531, 530, 707/501, 512; 382/182, 190, 309, 310, 321

[56] References Cited

U.S. PATENT DOCUMENTS

| | | | |
|---|---|---|---|
| 3,969,700 | 7/1976 | Bolinger et al. | 340/146.3 |
| 4,058,795 | 11/1977 | Balm | 340/146.3 |
| 4,580,241 | 4/1986 | Kucera | 364/900 |
| 4,654,875 | 3/1987 | Srihari et al. | 382/40 |
| 4,754,489 | 6/1988 | Bosker | 382/40 |
| 4,876,731 | 10/1989 | Loris et al. | 382/40 |
| 5,133,023 | 7/1992 | Bosker | 382/40 |
| 5,161,245 | 11/1992 | Fenwick | 382/40 |
| 5,377,281 | 12/1994 | Ballard et al. | 382/40 |
| 5,572,423 | 11/1996 | Church | 395/795 |
| 5,745,360 | 4/1998 | Leone et al. | 364/140 |
| 5,748,807 | 5/1998 | Lopresti et al. | 382/310 |
| 5,778,181 | 7/1998 | Hidary et al. | 395/200.48 |
| 5,781,909 | 7/1998 | Logan et al. | 707/200 |
| 5,793,966 | 8/1998 | Amstein et al. | 395/200.33 |
| 5,802,299 | 7/1998 | Logan et al. | 395/200.48 |
| 5,890,172 | 3/1999 | Bormans et al. | 707/501 |
| 5,892,919 | 4/1999 | Nielson | 395/200.58 |
| 5,907,680 | 5/1999 | Nielsen | 395/200.58 |

*Primary Examiner*—Stephen S. Hong
*Assistant Examiner*—Robert M. Stevens
*Attorney, Agent, or Firm*—Marc R. Mayer

[57] ABSTRACT

A computer program which causes a computer to correct a uniform resource identifier (URI) in a noisy source document. The program finds and corrects potential errors within a URI before turning the URI into a hyperlink. Testing the corrected URI is done by seeking the resource described by the corrected URI. Testing the URI also includes parsing the URI, identifying potential syntax errors within each portion of the URI, creating alternative URI combinations, and prioritizing the alternative URI combinations. Syntax errors corrected include incorrect protocol, incorrect or missing component separator characters, incorrect spacing, incorrect or missing dot character, and alphanumeric character replacement.

12 Claims, 3 Drawing Sheets

METHOD AND APPARATUS FOR CORRECTING A UNIFORM RESOURCE IDENTIFIER

BACKGROUND OF THE INVENTION

1. Field of the Invention

The present invention relates generally to correcting the text found within documents, and more specifically to correcting Uniform Resource Identifiers (URIs) within noisy documents.

2. Description of the Related Art

Optical scanners and optical character recognition (OCR) systems have become widely used for transferring written textual material into an electronic format. Optical scanners are electromechanical devices that systematically gather information about the relative brightness of light reflected from small defined areas of a page of paper. The data gathered by the optical scanner about the page are typically transferred to a computer in the form of a digital-graphical document representing the information gathered from the page. The OCR system calculates which alphanumeric characters are most likely represented by the digital-graphical data and creates a digital-textual document which represents the original document. In digital-textual documents, the text can be easily edited, and the formatting of the document can be easily manipulated.

OCR systems are not perfect and typically the digital-textual document contains errors when compared to the original document. This is particularly true for original documents containing Uniform Resource Identifiers (URIs). A URI is a standardized string of characters that provide resource identification and location information for resource discovery and access in a computer network environment and particularly on the internet. A URI is frequently far longer than most words, often uses words not found in a dictionary for its textual components, and uses numerous punctuation marks and specialized characters within its structure. These features make a URI particularly susceptible to errors in OCR systems.

URI errors are becoming more common as the increasing popularity of the internet means URIs are used more often in documents. In fact, it is becoming more common for computer applications to automatically recognize URIs within digital-textual documents and further to turn the URIs into hyperlinks. Hyperlinks are locations within a digital document that, when selected by the user of the computer displaying the digital document, automatically gather the resource found at a specific address on a computer or a computer network. When a URI has been turned into a hyperlink, it will retrieve the resource at the address described by the URI.

A URI must be error free in order to function properly as a hyperlink. The applications available today assume that the URI they are provided is complete and accurate. Furthermore, if errors do occur in the URI, they can be easily missed when the digital document is reviewed. Often such URI errors are not discovered until someone tries unsuccessfully to retrieve the resource defined by the URI.

From the forgoing it will be apparent that there is a need for a way to test and correct URIs found within the digital-textual documents created by OCR systems or other systems that reproduce text less than 100 percent accurately.

SUMMARY OF THE INVENTION

The invention solves the problem of incorrect URIs in noisy text by providing a method of testing and correcting the URIs. The method involves experimentally reconstructing a URI by parsing, detecting errors, correcting, and testing the validity of the URI using the structured syntax of the URI.

Generally the invention provides a computerized method for correcting a uniform resource identifier (URI) in noisy text by detecting a URI within the noisy source document, attempting to find a first resource identified by the URI, and correcting the URI if the first resource is not found. After the URI is corrected, it may be converted into a hyperlink.

Correcting the URI may include detecting a possible syntax error within the URI, creating an alternate URI without the possible syntax error, and attempting to find a second resource that is identified by the alternate URI. In this way the alternate URI is tested for validity.

Similarly, the URI may be parsed and the individual portions of the URI can be incrementally tested and corrected. Thus a resource, identified by a first portion of the URI, can then be sought, and if not found, a possible syntax error within the first portion of the URI can be detected. When a possible syntax error is found, an alternate first portion is created and the resource it identifies is sought. If the resource identified by the alternate first portion is found, then the alternate first portion is used in place of the first portion in the URI. In this way, the URI is corrected portion by portion.

One specific syntax error that may be detected and corrected in the URI is an incorrect separator character, "/". This character is easily mistaken for similar characters, such as "1", "1", or "I" by OCR systems.

A second specific syntax error that may be detected and corrected in the URI is an incorrect protocol. An incorrect protocol portion of the URI is detected by comparing the incorrect protocol portion to a list of known protocols. The incorrect protocol can then be replaced with a replacement protocol selected from the list of known protocols and tested again for validity.

A third specific syntax error which may be detected and corrected in the URI is the lack of two component-separator characters, "//", following a colon.

A fourth specific syntax error in the URI which may be detected and corrected is the introduction of spaces between components of the URI. To detect this problem, a combination of the URI and a word immediately following the URI in the source document is tested for validity. Similarly, a combination as described above but with a dot character, ".", inserted between the URI and the word immediately following the URI in the source document may also be tested.

The invention may also include minimizing the number of actual tests performed, since testing the URI is the most time consuming part of correcting the URI. These steps may include verifying that the portion to be tested is in proper form prior to testing, and ensuring that the most likely URI alternatives are tested before the less likely alternatives.

Other features and advantages of the present invention will become apparent from the following detailed description, taken in conjunction with the accompanying drawings, illustrating, by way of example, the principles of the invention.

DETAILED DESCRIPTION OF THE INVENTION

Figure 1:
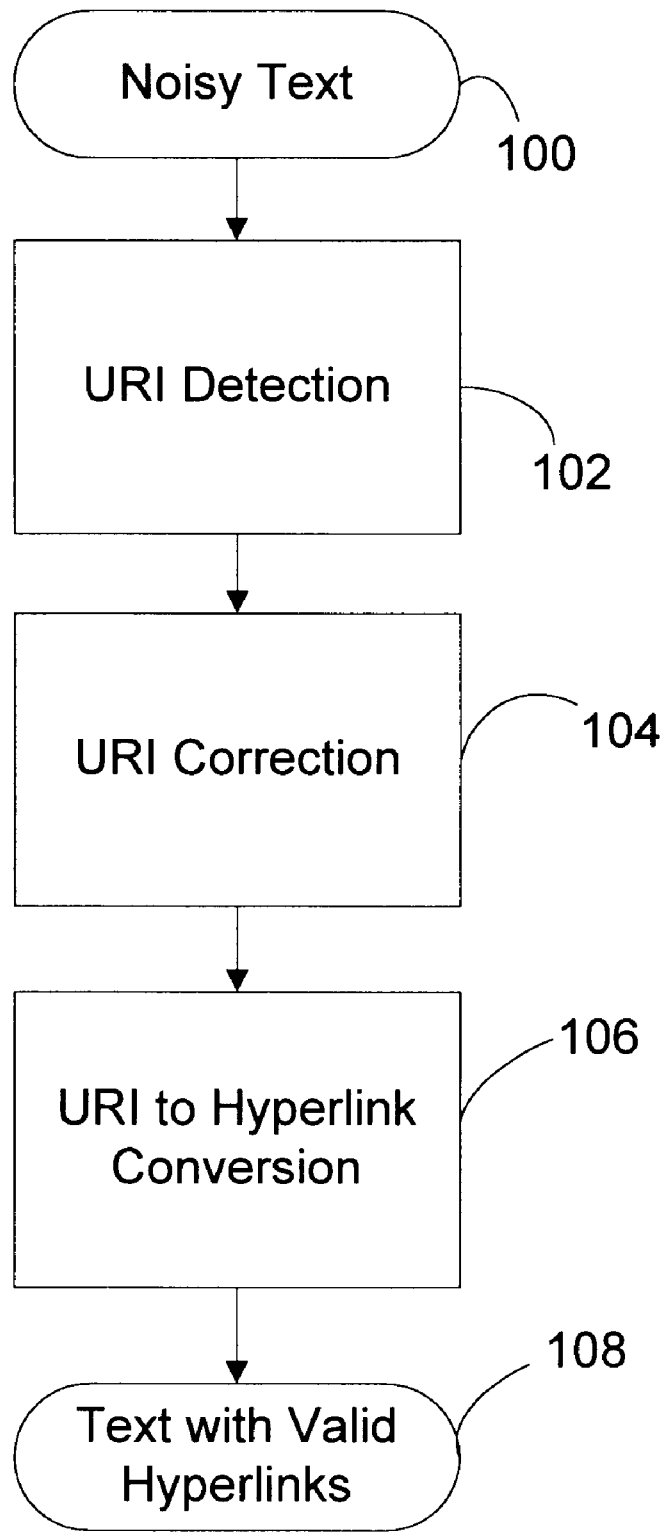
FIG. 1 is a block diagram depicting the creation of valid hyperlinks from noisy text.

The invention provides an apparatus and method, as shown in the drawings and described in detail below, for correcting a Uniform Resource Identifier (URI) in noisy text. The invention provides a solution to the growing problem of incorrect URIs found in noisy text derived from sources such as optical character recognition (OCR) systems. The problem stems from the fact that URIs are particularly susceptible to errors in OCR systems compounded by the fact that URIs that contain even slight errors are not functional. The invention automatically corrects these URI errors before they can cause any problems, saving both the time and effort necessary to manually correct the URI.

A URI is a standard format developed to conveniently and succinctly direct people and applications to the location of a resource available electronically. One of the most common types of URI in use today is the Uniform Resource Locator (URL), defined by Internet Request For Comments (RFC) 1738 which provides more definitive, technical information than will be provided here. A URL is used to specify in a single concise format numerous distinct pieces of information relevant to finding and utilizing computerized information. If a system existed to express in a single format a person's mailing address, phone number, and the location of a book she had out of a public library, this system would be analogous to a URL. A URL makes it possible to direct both people and software applications to a variety of information available from a number of different Internet protocols. Most commonly, URLs are used on the World Wide Web (WWW) as that medium uses URLs to link WWW pages together.

A URL has a specific syntax, as defined by RFC 1738. It generally follows the format of:

<protocol>:[//[<user>[:<password>]@]<host>[:<port>] [/<directory>/ . . . /<filename>]

Examples of various protocols are "http", "gopher", "ftp", and "news". The protocol tells the person or application using the URL what type of resource they are trying to reach and what mechanism to use to obtain that resource. A URL, like most URIs, generally will not function unless it is completely accurate.

Most protocols require that the URL include two different types of information. The first type of information defines the internet machine known as a "host" making the file available. The second type of information defines the "path" to a particular file or resource on the host. In a URL we generally see the protocol portion of the URL separated from the host address with two slashes "//", and the host address separated from the full path to the file with one slash "/" hereinafter referred to as a "component separator."

A URL will typically appear in the fashion: protocol:// machine.domain/full-path-of-file. For example, <http:// www.hp.com/pressrel/aug97/18aug97.htm>. (Note: a URL will be bracketed using the "<" and ">" symbols for clarity.) The protocol for this URL is <http>for the HyperText Transfer Protocol. The host address of the machine is <www.hp.com>, and the path to the file is <pressrel/aug97/ 18aug97.htm>. When working with the WWW, most URLs will appear with a similar overall structure.

It is also common that the "full-path-of-file" portion will end in a component separator. This indicates that the URL is pointing not to a specific file, but to a directory. In this case, the host generally returns a list of the contents of that directory, but might also return the contents of a default file in the directory.

As public use of the internet becomes more common, URIs appear more frequently in all types of written and electronic documents. URIs in electronic documents are particularly convenient as many software applications will automatically detect URIs and convert them into "hyperlinks." A hyperlink is a reference (link) from some point in one document to another document or another place in the same document. A hyperlink is usually displayed in the document in some distinguishing way, e.g., in a different color, font or style. When the user activates the link (e.g., by clicking on it with a mouse pointer) the application automatically displays the target of the link.

Often it is required that a written document be digitized and transferred into the form of an electronic document for ease of editing and formatting. This normally requires the use of an optical scanner and an Optical Character Recognition (OCR) system. OCR systems "translate" the digital (graphical) information produced by the optical scanner into the form of an electronic document with each text character represented individually as an electronic alphanumeric character. OCR "translations" of the digital graphical information are somewhat less than perfect, tending to create errors in the text of the electronic document.

URIs are particularly susceptible to these OCR errors because they do not have the syntax that the OCR is looking for. For example, a URI is frequently far longer than most words, often uses words not found in a dictionary, and contains numerous punctuation marks and specialized characters within its structure.

Electronic documents containing these OCR errors are referred to as "noisy text." Other forms of "noisy text" may come from any data communication technique resulting in electronic documents that are not completely error free.

Typical errors which are found in a URI include, but are not limited to:

1) component separators, "/", replaced with the numeral "1", the lower case letters "i" or "l," or the upper case letter "I";

2) a series of two component separators, "//" as in "http://", replaced with combinations of letters including, "H", "fl" or "ll";

3) the character "c" replaced with "C" or "o";

4) the character "l" replaced with an "I";

5) the character "m" replaced with "rn"; and 6) the character "S" replaced with "5."

FIG. 1 shows the invention as a method for detecting a URI, correcting it, and converting it into a hyperlink. Noisy text 100 is first scanned and a URI within the noisy text is detected 102. The URI is then corrected 104 through a combination of syntax checking, internet testing, and expansion as described in detail below. The corrected URI is then converted 106 into a hyperlink, resulting in text containing a valid hyperlink 108.

URL detection 102 is known in the art and utilizes basic pattern matching to recognize "words" that are good indicators that the surrounding word or words represent a URL. Such words include, but are not limited to, "http://", "ftp:", and "www." These words are derived from the fixed syntactic structure of a URL, as described above, which dictates that a URL often start with a fixed string, such as "http://." Similar principles can be applied in order to detect other types of URI. Once a URI is found, the invention checks and, if necessary, corrects 104 the URI before converting 106 it into a hyperlink 108 at that location.

Figure 2:
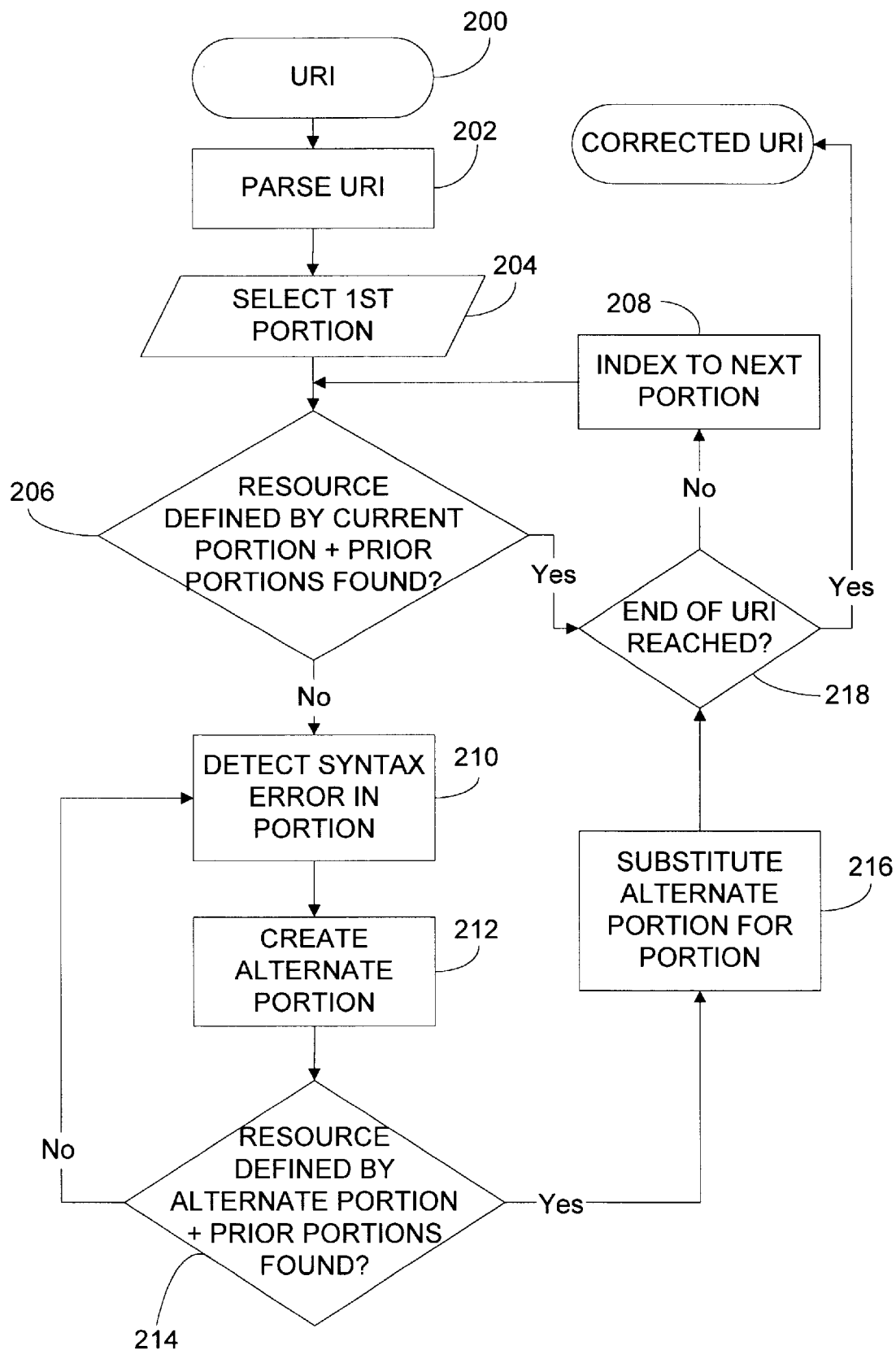
FIG. 2 is a block diagram depicting the correction of a URI by parsing.

FIG. 2 shows the basic method used by the invention to check and correct the URI. The basic approach involves incrementally building a valid URI making explicit use of hierarchical information embedded in the URI to gain partial information. In other words, a valid URI is grown based on the current knowledge. The component separator, "/", is crucial to this incremental correction, since partial URIs will almost invariably work if the full URI works.

First the URI 200 is parsed 202, normally breaking into portions which are separated by component-separator characters, such as "/", or potential component-separator characters. The first portion is then selected 204 and tested for validity. This is done by seeking 206 the resource defined by the first portion of the URI. If the resource is found, then the invention indexes 208 to the next portion. This next portion is then added to the first portion 204 and tested as a whole by seeking the resource 206 defined by the two portions together.

If the resource sought 206 is not found, the invention attempts to detect 210 a possible syntax error within the last portion added. This process will be described in detail below. Then an alternate portion of the URI is created 212. This alternate portion is the same as the portion in which the syntax error was detected, but with the possible syntax error corrected.

This alternate portion is then added to the first portion 204 and tested as a whole by seeking the resource 214 defined by the two portions together. If the resource is found, then the alternate portion which was created 212 is substituted 216 for the portion in which the syntax error was found. Then, if the end of the URI has not been reached 218, the invention once again indexes 208 to the next portion of the URI and the entire process repeats itself.

If the resource is not found, however, then another potential syntax error is detected 210 within the same portion that the first potential syntax error was detected. The process of creating an alternate portion 212 and seeking the resource defined by the alternate portion 214 is repeated until a resource is actually found.

An example of this type of method is given in the following pseudo-code:

```
1    URIcorrect (brokenURI)
2    {
3        if (URItest(brokenURI)) return brokenURI;
4        int I = strchr(brokenURI, ":");
5        StringBuffer buf =
6            new StringBuffer(brokenURI.subString(0, I++) +
                "/ /");
7        if (!match(brokenURI.charAt(I++), "H")) I++;
8        int last_valid = -1
9        for (; I < brokenURI.length(); I++) {
10           if (potentialSep(brokenURI.charAt(I)) &&
                URItest(buf)) {
11               buf.append("/");
12               last_valid =buf.length();
13               I++;
14           }
15           buf.append(brokenURI.charAt(I));
16       }
17       if (URItest(buf)) return buf;
18       if (last_valid > 0) return buf.subString(0,
             last_valid);
19       return null;
20   }
```

Figure 3:
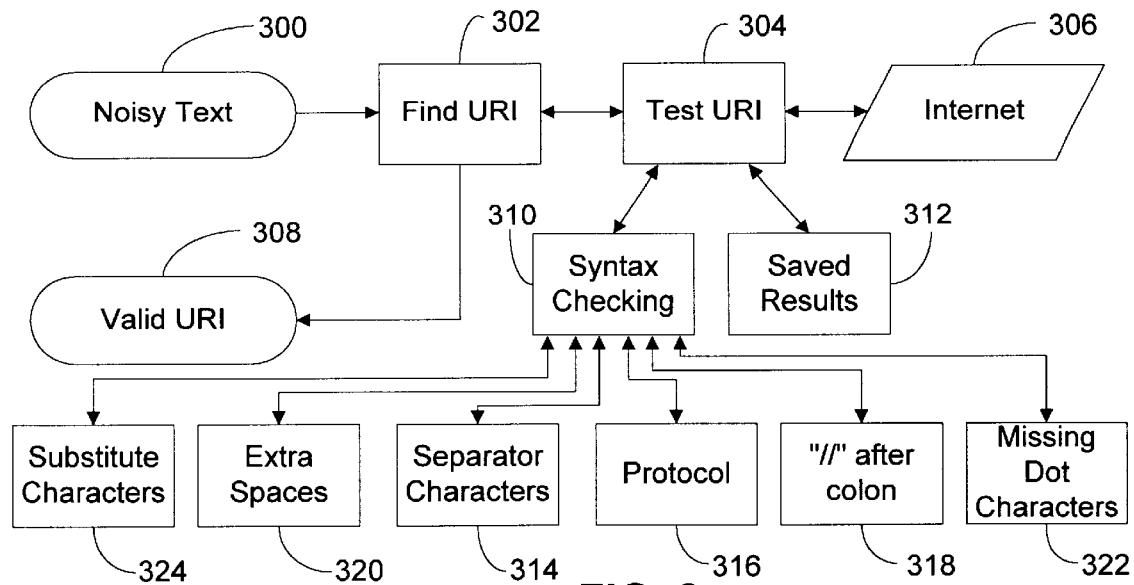
FIG. 3 is a block diagram providing further detail of the tests performed on a URI.

To illustrate the algorithm, step through its execution on a sample URI. The original URI was <http://test.hpl.hp.com/ org/internet/labsonly/joelmemo.htm>, but after OCR translation the URI in the noisy text was <http:Htest.hpl.hp.com-lorglinternetllabsonlyljoelmemo.htm>. URIcorrect (http:Htest.hpl.hp.comlorglinternetllabsonlyljoe lmemo.htm) would execute as follows:

line 3: test the whole string, which would fail line 4: set I to the location of the first ":" in the string, at character 5 line 5: set buf to "http://" and increment I to 6 line 7: brokenURI(7) is "H", so no action is taken line 8: last valid is set to −1 line 9–16: buf is incremented to <http://test.hp>, and I is incremented to 12 line 9: I is 13, brokenURI.charAt(I) is "l"

line 10: "l" is a possible separator, but URItest(http://test.hp) fails line 9–16: buf is incremented to <http://test.hpl.hp.com>and I is incremented to 19 line 9: I is 20, brokenURI.charAt(I) is "l"

line 10: "l" is a possible separator, and URItest(http://test.hpl.hp.com) succeeds line 11–13: last_valid is set to 21 and buf is incremented to <http://test.hpl.hp.com/> line 9–16: I is incremented to 23 and buf is incremented to <http://test.hpl.hp.com/org> line 9: I is 24 and buf is <http://test.hpl.hp.com/org> line 10: "l" is a possible separator and URItest(http://test.hpl.hp.com/org) succeeds FIG. 3 depicts the correction process according to the invention, focusing on the correction of numerous syntax problems which URIs in noisy text may possess. The noisy text 300 is scanned and a URI is found 302 using a method as described above. The URI is then tested 304. The testing process involves numerous aspects, but usually begins by checking the validity of the complete URI seeking the resource described by the URI on the internet 306. If the resource is found, the inquiry is complete and the URI is returned to the text as a valid URI 308. When a valid resource is not returned, however, additional syntax checking 310 must be done on the URI. This additional checking involves substituting possible corrections into the URI, and is often done after the URI has been parsed as described above. As possible errors are detected, numerous possibly-correct versions of the URI, or portions thereof, can be created. These possible correct versions are then saved 312 and sorted for validity testing by seeking the resources they describe on the internet 306.

A first specific syntax error in the URI which may be checked by the invention is an incorrect separator character, "/" 314. This character is easily mistaken for similar, potential-separator-confused character, such as "l", "1", or "I" by OCR systems. According to the invention, a potential-separator-confused character is first located within the URI. Next, the beginning portion of the URI, starting with the first character of the URI and ending with an alphanumeric character immediately preceding the identified potential-separator-confused character, is tested for validity. Finally, the identified potential-separator-confused character is replaced with a component separator character if the beginning portion tests as valid.

After replacing the identified potential-separator-confused character, the invention may test the validity of the URI in order to see if additional correction is necessary. The invention may then repeat the steps of identifying, testing the beginning portion for validity, and replacing the identified potential-separator-confused character, if the URI tests as invalid.

A second specific syntax error in the URI which may be checked by the invention is an incorrect protocol 316. An incorrect protocol portion of the URI is identified by comparing the incorrect protocol portion to a list of known protocols such as "ftp" or "http". The incorrect protocol is then replaced with a replacement protocol selected from the list of known protocols. The URI with the replacement protocol may then ben tested for validity by seeking the resources defined by the URI on the internet 306.

A third specific syntax error in the URI which may be checked by the invention is the lack of proper characters, "//", following the colon 318. As noted above, the "//" character combination is often incorrectly replaced with a "H", "fl", or "ll." Thus, the two characters following the colon are checked to verify that they are both component separator characters, "/". If they are not both component separator characters, then a determination is made as to how many characters, either one or two, should be replaced by the characters, "//." The URI with the replacement protocol may then be tested for validity by seeking the resources defined by the URI on the internet 306. In addition, after replacing the protocol or the "//" characters, the invention may test the protocol-host-port portion of the URI for validity 306 as described above.

A fourth specific syntax error in the URI which may be checked by the invention is the introduction of spaces between components of the URI 320. This is a fairly common error made by OCR systems. To correct this problem, a combination of the URI and a word immediately following the URI in the source document is tested for validity 306. The invention would then substitute the combination for the URI if the combination tests as valid.

Similarly, a fifth specific syntax error in the URI which may be checked by the invention is a missing dot character, "." 322. This most often occurs in conjunction with a space being placed between components as OCR systems will often mistake the dot character for a space. This problem is solved by testing a combination of the URI, a dot character, and the word immediately following the URI in the source document.

A sixth syntax error in the URI which may be checked by the invention are common substitution character errors 324. These are checked by comparing the URI to a list of common substitution errors made by the particular OCR system which is in use. Some typical errors of this type which may be checked are the substitution of "C" or "o" for "c" and the substitution of "rn" for "m." Thus, the common suffix of ".com" found in many URIs may appear as ".corn" in some URIS. When a potential error such as this is noted, a potentially correct substitution is made and tested in a manner as described above.

Figure 4:
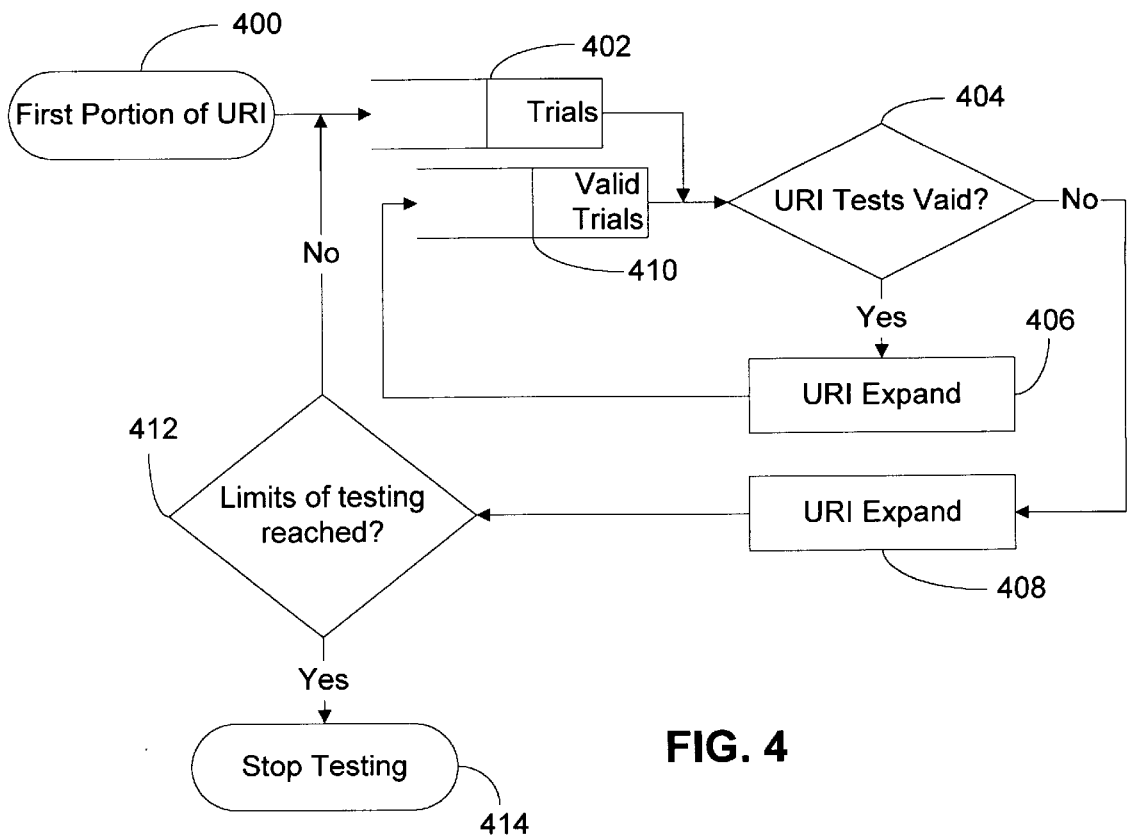
FIG. 4 is a block diagram depicting how the tests are prioritized according to the invention.

FIG. 4 is a further expansion of the testing block 304 of FIG. 3, particularly highlighting how potentially correct URIs are saved 312 for eventual testing. This method of saving the potentially correct URIs minimizes the number of tests for validity which must be performed on each URI by testing those results which are most likely correct before testing those that are likely to be incorrect. This is important because testing the validity of a URI by seeking the resources it defines is the most time consuming part of the correction of URIs, potentially taking as long as several minutes per test.

A first portion of a URI 400 is added to a "trials" queue 402. This first portion is usually the portion of a URI prior to the first identified potential error within the URI. The first portion is then taken from the "trials" queue and tested for validity 404 by seeking the resource which the URI describes. The first portion of the URI is then expanded 406, 408. Expansion involves creating a list containing alternative URI combinations derived from the tested portion. This list of alternative URIs combinations is then added back into the "trials" queue 402 if the first portion of the URI was invalid. It is added to a second queue called the "valid trials" queue 410, however, if the first portion tested as valid. Possible URI combinations for testing 404 are always taken from the "valid trials" queue 410 if there are any combinations in "valid trails" queue for testing. Thus, a possible URI combination for testing is only drawn from the "trials" queue 402 if there are no combinations left in the "valid trials" queue.

A first alternative URI combination is drawn from an appropriate queue 402, 410 following the pattern just described. The first alternative URI combination is tested 404 and a second list is created containing alternative URI combinations derived from the first alternative URI combination. As before, the second list is added to the "trials" queue 402 if the first alternative URI combination tests as invalid, and the second list is added to the "valid trials" queue 410 if the first alternative URI combination tests as valid. A second alternative URI combination can then be drawn from an appropriate queue and tested, with the process repeating in this manner until certain predefined limits of testing 412 are reached. When the limits of testing are reached, the testing stops 414. These limits of testing may be defined by the user and may include such factors as time taken for testing, number of words tested beyond the last valid URI, and the total number of tests performed.

The possible URI combinations saved in the "trials" queue 402 are less likely to be correct URI possibilities because these possible URI combinations are derived from portions that did not return valid resources. Nevertheless the invention retains these possible URI combinations in case an apparently valid URI is deemed to be invalid at a later stage of testing. The "trials" queue 402 allows the invention to start testing 404 again down another path at an earlier point in the testing tree.

This method can be further refined to minimize the number of tests done. This is done by not creating lists for certain partial URI combinations, alternatives of which are highly unlikely to result in the return of valid resources. For example, no lists need to be made for partial URLs ending in component separators that failed to return a valid resource.

The following example shows the function of the portion of the invention depicted in FIG. 4. Presume a correct URI is <http://test.hpl.hp.com/org> and that after OCR conversion into a digital-textual document the URI becomes <http://test. hpl. hp.corn/org>. The first portion 400 of this URI, <http:>, is placed in the "trials" queue 402, taken out of the "trials" queue, and then tested 404. This portion of the URI tests as invalid since no resource is identified by <http:>. <http:>is then expanded 408, resulting in a list containing <http://test.hp/>, <http://test.hpl> and <http://test.hpl/>. This list is added to the "trials" queue 402.

With no alternative URIs in the "valid trials" queue 410, the first alternative URI, <http://test.hp/> is taken from the "trials" queue. This first alternative URI tests as invalid since no resource is identified. This URI is then expanded 408 and the resulting list is added to the end of the trials queue 402.

With still no alternative URIs in the "valid trials" queue 410, the second alternative URI, <http://test.hpl> is selected from the "trials" queue 402. This URI tests as valid since a resource is identified. The URI is then expanded 406, creating a list containing <http://test.hpl/>, <http://test.hp>, <http://test.hpl.hp.corn/>, <http://test.hpl.hp.ccrn/>, and <http://test.hpl.hp.com/>. This list is added to the "valid trials" queue 410.

The next alternative URI, <http://test.hpl/> would be taken from the "valid trials" queue 410. It would test as invalid 404, get expanded 408 and the resulting list would be added to the "trials" queue 402. The same is true for the next three alternative URIs taken from the "valid trials" queue 410, <http://test.hp>, <http://test.hpl.hp.corn/>, and <http://test.hpl.hp.ccrn/>.

The next alternative URI taken from the "valid trials" queue 410 would be <http://test.hpl.hp.com/>. This would test as valid 404 and would get expanded 406 into a list including <http://test.hpl.hp.com/crg> and <http://test.hpl.hp.com/org>. The list is added to the "valid trials" queue 410.

The next alternative URI to come from the "valid trials" queue 410 would be <http://test.hpl.hp.com/crg>. This would test as invalid 404, get expanded 408, and the resulting list would be placed in the "trials" queue 402. Finally, the last alternative URI in the "valid trials" queue 402, <http://test.hpl.hp.com/org>, would be tested 404 as valid. The last alternative URI would then be expanded 406. The only expansion possible in this case is adding the next word in the noisy text to the last alternative URI, <http://test.hpl.hp.com/org/nextword>. This alternative would be added to the "valid trials" queue 410, and then tested 404. It would test as invalid and get expanded 408 by the addition of yet another word from the noisy text. This process would continue with repeated invalid testing 404 and eventually a limit of testing 412 will be reached. An example of a limit of testing would be the addition of more than a certain number of words from the noisy text to a valid URI without any valid results. Once the limit of testing was reached 412 the testing would stop 414. The last valid URI tested, <http://test.hpl.hp.com/org>, would then be substituted for the URI found in the noisy text, <http: //test. hpl. hp.corn/ org>.

The invention is described below in pseudo code using four functions: URICorrect( ), URITest( ), URIEnumerate( ), and URIEnumerateWordEnd ( ). URICorrect drives the whole process, using URITest( ) and URIEnumerate( ). URITest( ) implements the aspects of the invention depicted in FIG. 4 by using two queues. URICorrect( ) will preferentially test and expand possible URI combinations from the validTrials queue.

URIEnumerate( ), selectively expands the URI. It is passed a single URI as well as some information about the URI, such as whether it is valid and how many words have been incorporated into it since it was last valid, and it returns a set of new URIs which are expansions of the original URI.

URIEnumerateWordEnd( ) is used to expand the options when the system has finished parsing the end of a word in the source document. Since the OCR system can divide single URIs into multiple words, typically because of line breaks or punctuation, the invention tries to glue words together, potentially inserting punctuation marks such a "." that may have been dropped by the OCR system.

```
1   URIcorrect(brokenURI)
2   {
3       int testCount = 0;
4       trials = URIEnumerate(brokenURI);
5       while ((validTrials.size() > 0 || trials.size() > 0) &&
                testCount < maxTests) {
6
7           if (validTrials.size() > 0) {
8               URITest(validTrials.pop());
9           } else {
10              URITest(trials.pop());
11          }
12          testcount++;
13      }
14  }
1   URITest(URI)
2   {
3       if (testURI(URI)) {
4           mark URI valid, reset word count;
5           validTrials.union(URIEnumerate(URI));
6       } else {
7           if (URI's last character != '/'); {
8               trials.union(URIEnumerate(URI));
9       }
10  }
1   URIEnumerate (URI)
2   {
3       if (point at the end of a word) {
4           return URIEnumerateWordEnd(URI);
5       }
6       while (true) {
7           for each common OCR mistake {
8               if (mistake matches current tail of URI) {
9                   correctedURI = URI with 'correcting'
                        substitution;
10                  if (correcting substitution == '/') {
11                      result.union(correctedURI);
12                  } else {
13                      result.union(URIEnumerate(correctedURI));
14                  }
15              }
16          }
17          URI = URI + next character;
18          move point;
19          if (point at the end of a word ||
20              point at a directory separator) {
21              if (next character == '/' && end of URI == '/') break;
22              if (URI was valid at last test) {
23                  march backwards through URI chopping characters {
24                      result.union(chopped URI + '/');
25                      result.union(chopped URI);
26              }
27              result.union(URI);
28              if (next character != '/') result.union(URI + '/');
29              break;
30          }
31          return result;
32  }
1   URIEnumerateWordEnd (URI)
2   {
3       next = next word;
4       if (URI does not end in '/') {
5           result.union(URI + "/");
6       }
7       // remove trailing punctuation
8       result.union(new URI (URI with last character removed));
9       if (we are at end of document, or have gone too far
10          past the last working URI)
11          return result;
12      result.union(current URI, move point to next word);
13      if(last character of this word != '.' &&
14          first character of next word != '.') {
15          result.union(URI + '.', move point to next word);
16      }
17      return result;
18  }
```

Although several specific embodiments of the invention have been described and illustrated, the invention is not to be limited to the specific forms or arrangements of the parts so described and illustrated. The invention is limited only by the claims.

We claim:

1. A program storage medium readable by a computer, tangibly embodying a program of instructions executable by the computer to perform method steps for correcting a uniform resource identifier (URI) in a noisy source document, said method steps comprising:

detecting the URI within the noisy source document;

attempting to find a first resource identified by the URI; and correcting the URI when the first resource is not found including:

identifying a potential-separator-confused character within the URI, testing for validity a beginning portion of the URI, the beginning portion starting with a first character of the URI and ending with an alphanumeric character immediately preceding the identified potential-separator-confused character, and replacing the identified potential-separator-confused character with a component separator character when the beginning portion tests as valid.

2. The program storage medium of claim 1, wherein the step of correcting the URI further includes:

identifying an incorrect protocol portion of the URI by comparing the incorrect protocol portion to a list of known protocols; and replacing the incorrect protocol with a replacement protocol selected from the list of known protocols.

3. The program storage medium of claim 1, wherein the step of correcting the URI further includes:

testing the URL for validity after replacing the identified potential-separator-confused character.

4. A program storage medium readable by a computer, tangibly embodying a program of instructions executable by the computer to perform method steps for correcting a uniform resource identifier (URI) in a noisy source document, said method steps comprising:

detecting the URI within the noisy source document;

attempting to find a first resource identified by the URI; and correcting the URI when the first resource is not found, including:

testing for validity a combination, the combination including the URI and a word immediately following the URI in the source document, and substituting the combination for the URI when the combination tests as valid.

5. The program storage medium of claim 4, wherein the combination further includes a dot character inserted between the URI and the word immediately following the URI in the source document.

6. The program storage medium of claim 1, wherein the step of correcting the URI further includes:

testing for validity a protocol-host-port portion of the URI.

7. A program storage medium readable by a computer, tangibly embodying a program of instructions executable by the computer to perform method steps for correcting a corrupted uniform resource identifier in noisy text, said method steps comprising:

identifying a potential mistake within the uniform resource identifier (URI);

testing for validity a portion of the URI prior to the potential mistake;

creating a first list, the first list containing a plurality of alternative URI combinations derived from the portion;

adding the first list to a first queue when the portion tests as invalid;

adding the first list to a second queue when the portion tests as valid;

taking a first alternative URI combination from the first queue when the second queue is empty;

taking the first alternative URI combination from the second queue when the second queue is not empty; and testing for validity the first alternative URI combination.

8. The program storage medium of claim 7, wherein the method steps further comprise:

creating a second list when the first alternative URI combination does not test as invalid and does not end in a separator character, the second list containing a plurality of alternative URI combinations derived from the first alternative URI combination;

adding the second list to the first queue when the first alternative URI combination tests as invalid;

adding the second list to the second queue when the first alternative URI combination tests as valid;

taking a second alternative URI combination from the first queue when the second queue is empty;

taking a second alternative URI combination from the second queue when the second queue is not empty; and testing for validity the second alternative URI combination.

9. A method for correcting a uniform resource identifier (URI) in a noisy source document comprising:

detecting the URI within the noisy source document;

attempting to find a first resource identified by the URI; and correcting the URI when the first resource is not found, including:

identifying a potential-separator-confused character within the URI, testing for validity a beginning portion of the URI, the beginning portion starting with a first character of the URI and ending with an alphanumeric character immediately preceding the identified potential-separator-confused character, and replacing the identified potential-separator-confused character with a component separator character when the beginning portion tests as valid.

10. The method of claim 9, wherein the step of correcting the URI further comprises:

testing for validity a combination, the combination including the URI and a word immediately following the URI in the source document; and substituting the combination for the URI when the combination tests as valid.

11. A method for correcting a uniform resource identifier (URI) in a noisy source document comprising:

detecting the URI within the noisy source document;

attempting to find a first resource identified by the URI; and correcting the URI when the first resource is not found, including:

identifying a potential mistake within the uniform resource identifier (URI), testing for validity a portion of the URI prior to the potential mistake, creating a first list, the first list containing a plurality of alternative URI combinations derived from the portion, adding the first list to a first queue when the portion tests as invalid, adding the first list to a second queue when the portion tests as valid, taking a first alternative URI combination from the first queue when the second queue is empty, taking the first alternative URI combination from the second queue when the second queue is not empty, testing for validity the first alternative URI combination, creating a second list when the first alternative URI combination does not test as invalid and does not end in a separator character, the second list containing a plurality of alternative URI combinations derived from the first alternative URI combination, adding the second list to the first queue when the first alternative URI combination tests as invalid, adding the second list to the second queue when the first alternative URI combination tests as valid, taking a second alternative URI combination from the first queue when the second queue is empty, taking a second alternative URI combination from the second queue when the second queue is not empty, and testing for validity the second alternative URI combination.

12. A program storage medium readable by a computer, tangibly embodying a program of instructions executable by the computer to perform method steps for correcting a corrupted uniform resource identifier in noisy text, said method steps comprising:

identifying a potential mistake within the uniform resource identifier (URI);

testing for validity a portion of the URI prior to the potential mistake;

creating a list containing a plurality of alternative URI combinations derived from the portion;

adding the list to a queue when the portion tests as invalid;

taking a first alternative URI combination from the queue; and testing for validity the first alternative URI combination.

* * * * *